(12) United States Patent
Catalano et al.

(10) Patent No.: US 11,153,361 B2
(45) Date of Patent: Oct. 19, 2021

(54) ADDRESSING PACKET LOSS IN A VOICE OVER INTERNET PROTOCOL NETWORK USING PHONEMIC RESTORATION

(71) Applicant: International Business Machines Corporation, Armonk, NY (US)

(72) Inventors: Pasquale A. Catalano, Wallkill, NY (US); John S. Werner, Poughkeepsie, NY (US); Andrew G. Crimmins, Montrose, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

(21) Appl. No.: 15/823,676

(22) Filed: Nov. 28, 2017

(65) Prior Publication Data

US 2019/0166181 A1 May 30, 2019

(51) Int. Cl.
*H04L 29/06* (2006.01)
*H04L 12/24* (2006.01)
*H04L 12/26* (2006.01)

(52) U.S. Cl.
CPC .......... *H04L 65/80* (2013.01); *H04L 41/5025* (2013.01); *H04L 43/0835* (2013.01)

(58) Field of Classification Search
None
See application file for complete search history.

(56) References Cited

U.S. PATENT DOCUMENTS

| | | | |
|---|---|---|---|
| 7,003,086 B1* | 2/2006 | Shaffer | H04L 12/1813 379/202.01 |
| 7,822,188 B1* | 10/2010 | Kirchhoff | H04M 3/42263 379/211.02 |
| 8,582,465 B2 | 11/2013 | Ramalho | |
| 9,172,726 B2 | 10/2015 | Krstulich | |
| 9,380,100 B2 | 6/2016 | Narbutt | |
| 9,614,756 B2 | 4/2017 | Joshi | |

(Continued)

FOREIGN PATENT DOCUMENTS

| | | |
|---|---|---|
| CN | 101577609 A | 11/2009 |
| CN | 105071980 A | 11/2015 |
| EP | 2521320 A1 | 11/2012 |

OTHER PUBLICATIONS

S. R. Miralavi, et al., "Packet Loss Replacement in VOIP Using a Recursive Low-Order Autoregressive Model-Based Speech," 8th International Multi-Conference on Systems, Signals & Devices, IEEE, 2011, p. 1-4.

*Primary Examiner* — Mariela Vidal Carpio
(74) *Attorney, Agent, or Firm* — Cantor Colburn LLP; Teddi Maranzano (57) ABSTRACT

Embodiments include method, systems and computer program products for addressing packet loss over a Voice over Internet Protocol (VoIP) network using phonemic restoration. The method includes receiving, by a processor, a plurality of data packets associated with a VoIP call. The processor further determines that one or more of the plurality of data packets have been lost or discarded. The processor further inserts, a sound into the VoIP call in response to the one or more of the plurality of data packets being lost or discarded. The processor further sends the sound to an output device in order to trigger a phonemic restoration response by a listener.

17 Claims, 4 Drawing Sheets

(56) References Cited

U.S. PATENT DOCUMENTS

| | | | |
|---|---|---|---|
| 2006/0109786 A1* | 5/2006 | Abdel-Kader | H04L 29/06027 370/232 |
| 2007/0268887 A1* | 11/2007 | Schwartz | H04L 47/10 370/352 |
| 2007/0282601 A1* | 12/2007 | Li | G10L 19/005 704/207 |
| 2009/0086631 A1* | 4/2009 | Jayapalan | H04M 3/2227 370/231 |
| 2009/0300459 A1* | 12/2009 | Fukuoka | H04L 1/1825 714/751 |
| 2010/0131264 A1* | 5/2010 | Ljolje | G06F 17/27 704/9 |
| 2010/0195507 A1* | 8/2010 | Marinier | H04L 1/20 370/242 |
| 2015/0100315 A1* | 4/2015 | Bianco | H04M 3/42391 704/235 |
| 2017/0201414 A1* | 7/2017 | Shin | H04M 1/72522 |
| 2018/0315438 A1* | 11/2018 | Davies | G10L 21/02 |

\* cited by examiner

ADDRESSING PACKET LOSS IN A VOICE OVER INTERNET PROTOCOL NETWORK USING PHONEMIC RESTORATION

BACKGROUND

The present invention relates to communications over a Voice over Internet Protocol (VoIP) network, and more specifically, to addressing packet loss over the VoIP network using phonemic restoration during VoIP calls.

Voice over Internet Protocol (VoIP) is a methodology and group of technologies for the delivery of voice communications and multimedia sessions over Internet Protocol (IP) networks, such as the Internet.

VoIP packet loss occurs when a large amount of traffic on an IP network causes dropped packets. When VoIP packet loss occurs during a VoIP call, the packet loss can result in poor call quality, i.e., dropped conversations, a delay in receiving the voice communication, or extraneous noise on the call.

SUMMARY

Embodiments of the invention are directed to a method for addressing packet loss over a Voice over Internet Protocol (VoIP) network using phonemic restoration. A non-limiting example of the computer-implemented method includes receiving, by a processor, a plurality of data packets associated with a VoIP call. The processor further determines that one or more of the plurality of data packets have been lost or discarded. The processor further inserts a sound into the VoIP call in response to the one or more of the plurality of data packets being lost or discarded. The processor further sends the sound to an output device in order to trigger a phonemic restoration response by a listener.

Embodiments of the invention are directed to a computer program product that can include a storage medium readable by a processing circuit that can store instructions for execution by the processing circuit for performing a method for addressing packet loss over a Voice over Internet Protocol (VoIP) network using phonemic restoration. A non-limiting example of the computer-implemented method includes receiving a plurality of data packets associated with a VoIP call. The method further includes determining that one or more of the plurality of data packets have been lost or discarded. The method further includes inserting a sound into the VoIP call in response to the one or more of the plurality of data packets being lost or discarded. The method further includes sending the sound to an output device in order to trigger a phonemic restoration response by a listener.

Embodiments of the invention are directed to a system. A non-limiting example of the system can include a processor in communication with one or more types of memory. The processor can be configured to receive a plurality of data packets associated with a Voice over Internet Protocol (VoIP) call. The processor can be further configured to determine that one or more of the plurality of data packets have been lost or discarded. The processor can be further configured to insert a sound into the VoIP call in response to the one or more of the plurality of data packets being lost or discarded. The processor can be further configured to send the sound to an output device in order to trigger a phonemic restoration response by a listener.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems and computer program products for addressing packet loss in a Voice over Internet Protocol (VoIP) network using phonemic restoration is described herewith.

VoIP communications allow for voice communications and multimedia sessions over Internet Protocol (IP) networks. Communications over an IP network is perceived as less reliable in contrast to circuit-switched public telephone network because it does not provide a network-based mechanism to ensure that data packets are not lost, and are delivered in sequential order.

Packet loss can cause a variety of degradation issues during VoIP voice communications, for example, dropped calls, broken audio, clicking, or even silence. Accordingly, packet loss can result in poor quality of service leading to customer dissatisfaction.

There are two types of packet loss in a VoIP system: receive packet loss and receive packet discard. Receive packet loss occurs when packets are lost somewhere within a VoIP network and are never delivered to the receiving system. Receive packet discard occurs when a packet is received at a time when the packet is not useable for generating audio playback.

Accordingly, creating a better user experience with VoIP communications by masking poor call quality would be beneficial. This can be especially applicable when addressing call quality on lossy VoIP networks.

Turning now to an overview of aspects of the present invention, one or more embodiments of the invention provide methods, systems, structures and computer program products configured to address packet loss over the VoIP network using phonemic restoration. In order to address poor call quality during VoIP calls, sounds can be inserted into locations in which packets have been lost during a VoIP call in order to trigger a human response (phonemic restoration) that can be used to mask the lost packets by causing the human brain to restore sounds missing from speech signals. Accordingly, a better user experience during a VoIP call can be implemented because the callers have the perception of less call quality degradation during the VoIP call.

Figure 1:
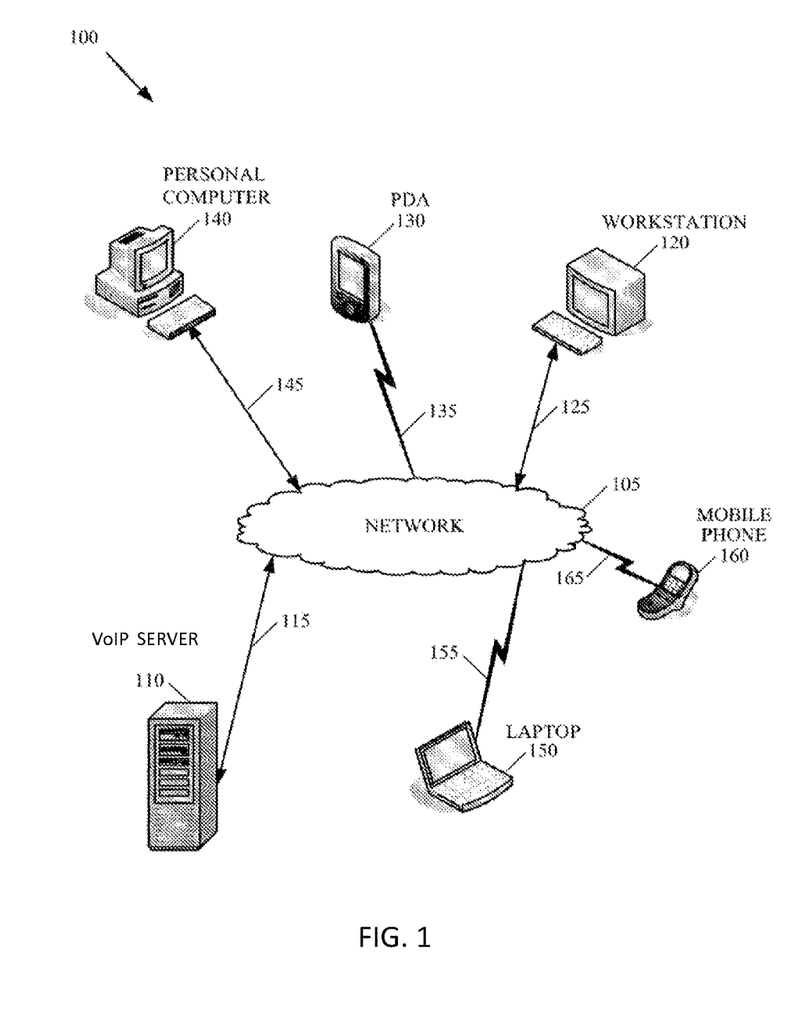
FIG. 1 is an exemplary diagram of a VoIP system in which exemplary aspects of the present invention may be implemented.

With reference now to the figures, FIG. 1 depicts a pictorial representation of an exemplary Voice over Internet Protocol (VoIP) system 100 in which aspects of the illustrative embodiments of the present invention may be implemented. The VoIP system 100 can include a network 105, VoIP server 110 connected to network 105 through wireline connection 115 and VoIP devices (i.e., a workstation 120, a computer coupled to network 105 through wireline connection 125, personal digital assistant (PDA) 130, coupled to network 105 through wireless connection 135, personal computer 140, coupled to network 105 through wireline connection 145, laptop computer 150, coupled to network 105 through wireless connection 155; and mobile phone 160, coupled to network 105 through wireless connection 165).

Network 105, which may include the Internet or another wide area network, a local area network, or a combination of networks, may provide data communications among the VoIP monitoring server 110 and the VoIP devices 120, 130, 140, 150, and 160. VoIP server 110 may have software to facilitate communications and monitor and address packet loss in communications (VoIP calls) across network 105. VoIP server 110 may receive requests to make VoIP calls. For example, VoIP server 110 may receive digital data representing a telephone number. VoIP server 110 may determine that the request to make a VoIP call is in the proper format, and may determine an IP address for a recipient or recipients. VoIP server 110 may establish a virtual connection between the VoIP device placing the VoIP call and a destination VoIP device, thereby establishing a VoIP call session. In other embodiments, VoIP call sessions may be transmitted between VoIP devices without a server such as VoIP server 110.

Users may participate in VoIP conversations using VoIP devices, such as devices 120, 130, 140, 150, and 160. In some embodiments, the VoIP devices such as devices 120, 130, 140, 150, and 160 may run client software. When a participant opens client software, the client may attempt to connect with VoIP server 110. If the connection is successful, the client may inform the VoIP server 110 of the participant's Internet Protocol (IP) address, a number identifying the VoIP device, and the number of a port assigned to the client. In other embodiments, a participant may visit a website using a VoIP device to participate in a VoIP call. In this case no client software may reside on the participant's VoIP device.

Figure 2:
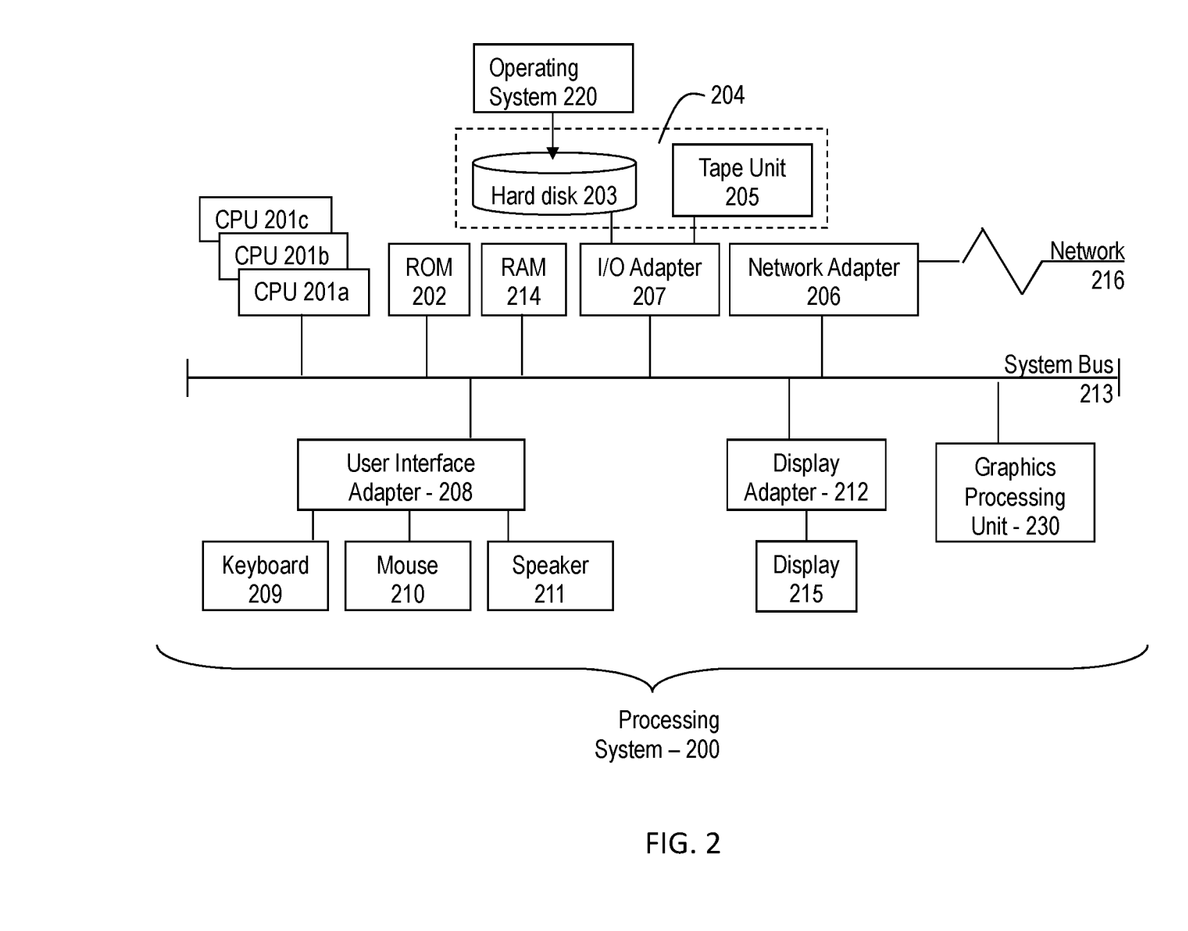
FIG. 2 is a block diagram illustrating one example of a processing system for practice of the teachings herein.

With reference now to FIG. 2, a block diagram of an exemplary data processing system is shown in which aspects of the exemplary embodiments of the present invention may be implemented. The processing system 200 can form at least a portion of the VoIP server 110 and one or more VoIP devices, such VoIP devices, 120, 130, 140, 150, and 160. In this embodiment, the processing system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory, for example, random access memory (RAM) 214 and various other components via a system bus 213. Read-only memory (ROM) 202 is coupled to the system bus 213 and may include a basic input/output system (BIOS), which controls certain basic functions of system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. A network adapter 206 interconnects bus 213 with an outside network 216 enabling data processing system 200 to communicate with other such systems. A screen (e.g., a display monitor) 215 is connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A keyboard 209, mouse 210, and speaker 211 are all interconnected to system bus 213 via user interface adapter 208, which may include, for example, a Super I/O chip integrating multiple device adapters into a single integrated circuit.

In exemplary embodiments, the processing system 200 includes a graphics processing unit 230. Graphics processing unit 230 is a specialized electronic circuit designed to manipulate and alter memory to accelerate the creation of images in a frame buffer intended for output to a display. In general, the graphics processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as keyboard 209 and mouse 210, and output capability including speaker 211 and display 215. In one embodiment, a portion of system memory 214 and mass storage 204 collectively store an operating system 220.

The operating system 220 essentially controls the execution of other computer programs by the processor 201 and provides scheduling, input-output control, file and data management, memory management, and communication control and related services. The operating system 220 also coordinates and provides control of various components within the processing system 200.

Figure 3:
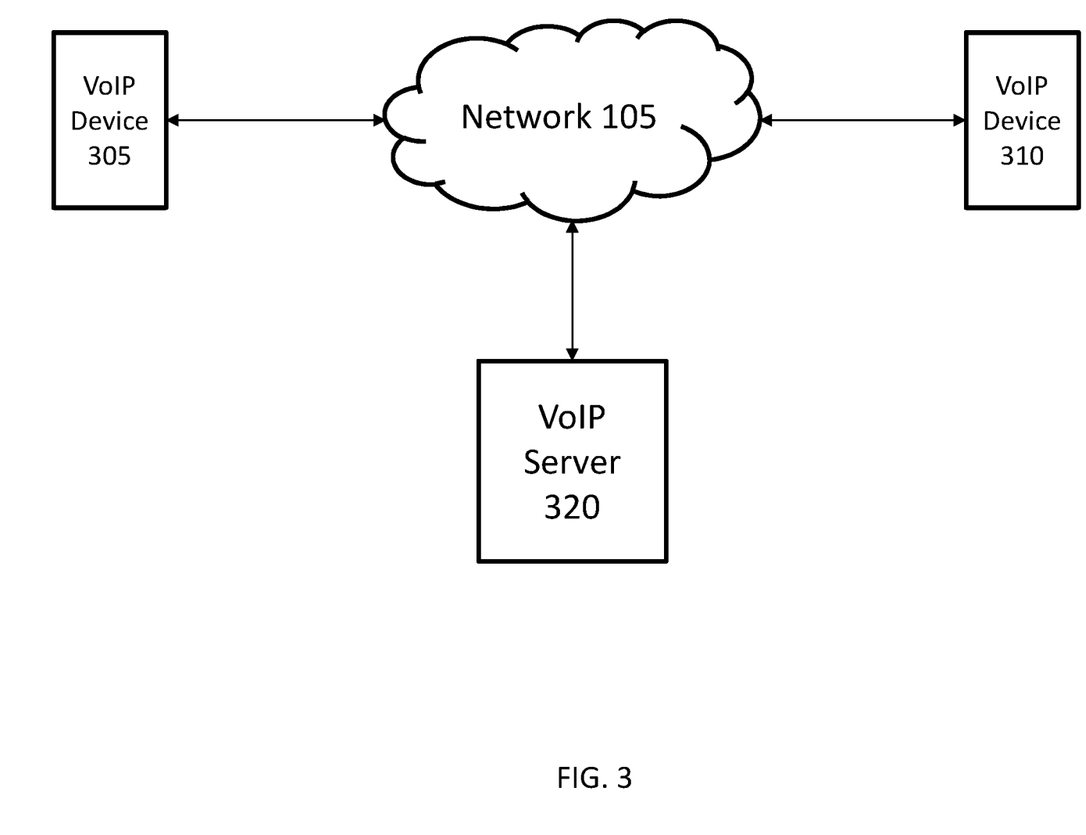
FIG. 3 is an illustration of an interaction between VoIP devices during a VoIP call according to one or more embodiments of the present invention.

FIG. 3 is a diagram 300 illustrating an interaction between VoIP devices during a VoIP call according to one or more embodiments of the present invention. In diagram 300, VoIP device 305 can conduct a VoIP call directed to VoIP device 310 via network 105 and VoIP server 320. During the VoIP voice call between VoIP devices 305 and 310, call quality degradation can occur due to packets being lost while callers are communicating.

To address such degradation, VoIP server 320 can introduce a sound, (ex, a cough, tone or common background sound) into the communication at an instance where the packet loss occurs. The duration of the sound introduced by the server 320 can vary in order to mask a varying number of lost packets. For example, a single VoIP data packet can contain 20-30 milliseconds (ms) of voice data. Accordingly, the duration of the sound can be 20 ms or longer depending on the number of packets being masked. However, when too many consecutive packets are lost and/or discarded (i.e., very poor call quality), introducing a sound may not assist in improving perceived call quality.

The introduction of the sound by server 320 is utilized to trigger phonemic restoration within the brain of the listener. Phonemic restoration is a perceptual phenomenon where under certain conditions sounds missing from speech can be restored by the brain and may appear to be heard. Phonemic restoration occurs when missing phonemes in an auditory signal are replaced with a masking noise, resulting in the brain filling in absent phonemes. Accordingly, when a masking noise (i.e., sound) is introduced, some listeners may not even notice that there are phonemes missing. Different factors can change the strength of the effect of phonemic restoration, including age and gender.

Accordingly, during the VoIP call, upon detection of received packet loss or received packet discard errors, a sound can be inserted into the audio stream produced by a caller at the desired location where the packet loss or discard errors occur in order to trigger a phonemic restoration response in the listener. Because the introduced sound can cause the listener's brain to fill in absent phonemes lost due to the degradation, the listener would perceive improved call quality because certain amounts of degradation are masked by the listener's brain.

When the VoIP server 320 has information regarding personal details of a caller, i.e., gender, age, tone or other specifics, sounds introduced by the server 320 can be tailored to reflect the personal details of a caller's speech. For example, a cough introduced can reflect an adult male or a female child or the like. Also, different sounds can be used depending on the number of packets that have been lost or discarded.

In addition, VoIP server 320 can determine whether call degradation is too great, i.e., too many consecutive packets are lost and/or discarded. If the VoIP server 320 determines that call degradation is too great, the VoIP server 320 can institute other methods to remedy the poor call quality (ex., alert callers to poor quality, terminate VoIP call or attempt to re-establish the VoIP call) instead of inserting a sound.

In some implementations, VoIP devices (305, 310) can introduce a sound, (ex, a cough, tone or common background sound) into the communication at an instance where the packet loss or packet discard errors occur instead of server 320. VoIP device 305 and 310 can include client software that can address packet loss over a VoIP network in a manner similar to server 320.

Figure 4:
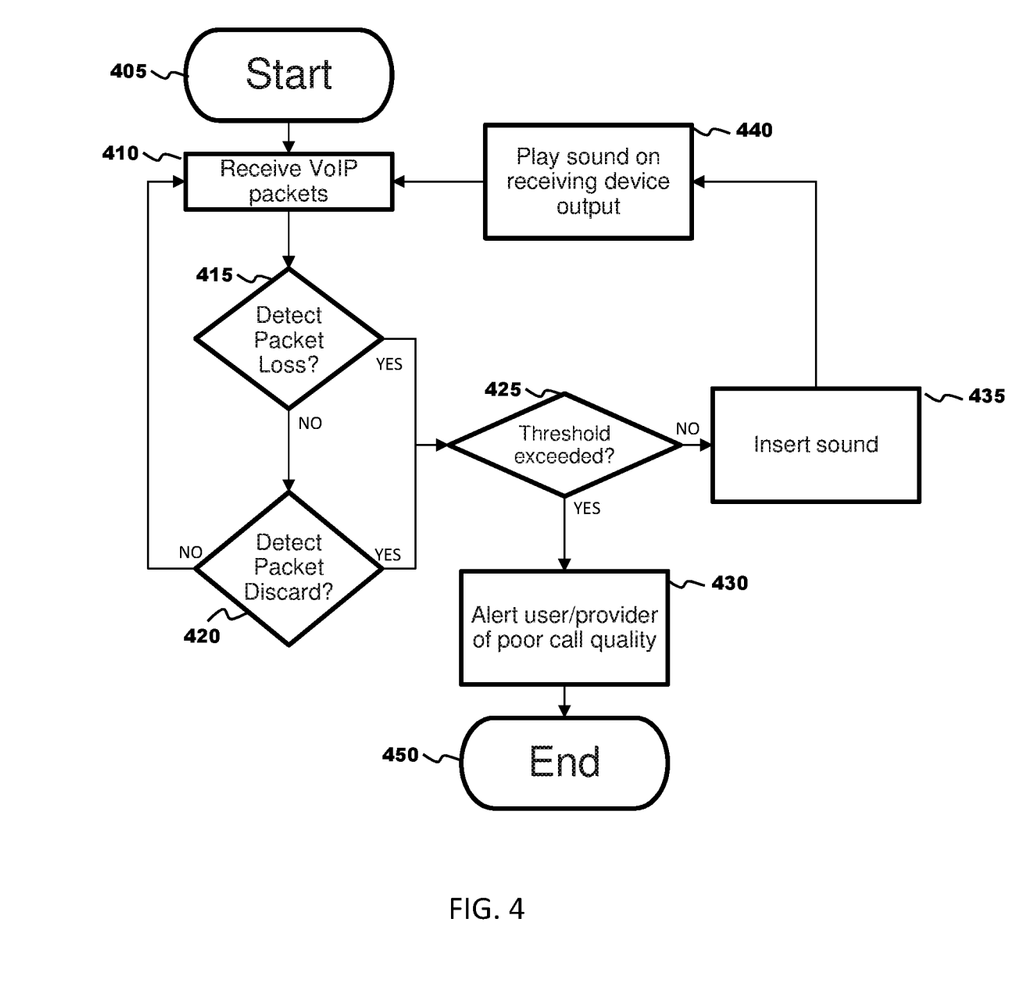
FIG. 4 is a flow diagram illustrating a method of addressing packet loss over the VoIP network using phonemic restoration according to one or more embodiments of the present invention.

FIG. 4 is a flow diagram illustrating a computer-implemented method 400 of addressing packet loss over a VoIP network using phonemic restoration according to one or more embodiments of the present invention. After starting at block 405, the computer-implemented method proceeds to block 410 where during a VoIP call, VoIP packets are received by a VoIP server.

At block 415, the server can detect whether one or more received VoIP packets have been lost. If the server detects that one or more VoIP packets have been lost, the method 400 proceeds to block 425. If the server detects that one or more VoIP packets have not been lost, the method 400 proceeds to block 420 where the server determines whether VoIP packets have been discarded. If VoIP packets have not been discarded, the method 400 returns to block 410. If VoIP packets have been discarded, the method 400 proceeds to block 425.

At block 425, the server determines whether the number of VoIP packets that have been lost or discarded, or a duration of lost or discarded VoIP packets has exceeded a predetermined threshold. For example, given that an average VoIP packet size can contain 25 ms of voice data, the threshold in light of a number of VoIP packets that have been lost or discarded can be 10 consecutive packs that are lost or discarded or less, or in light of a duration of lost or discarded VoIP packets, less than ¼ second. If the server determines that the number of packets that have been lost or discarded has exceeded the predetermined threshold, method 400 proceeds to block 430 where the server can alert the parties to the VoIP call and/or a VoIP service provider of the poor call quality of the VoIP call. The method 400 would subsequently end at block 450.

If the number of packets that have been lost or discarded has not exceeded the predetermined threshold, the method proceeds to block 435, where the server can introduce a sound into the VoIP call where detected packet loss or discard has occurred in order to trigger a phonemic restoration response by the listener. The sound can vary in duration and type. The duration of the sound can be equal to the number of packets lost or discarded. At block 440, the sound is played on a listener's VoIP device. After block 440, method 400 returns to block 410.

Embodiments of the present invention can react to detected packet loss by inserting a sound to invoke a phonemic restoration effect by the listener on the receiving end of a VoIP call. Accordingly, the present invention can create a better user experience with VoIP communication due to users having the perception of less call quality degradation.

Embodiments of the present invention can additionally implement a server that can reconstruct missing voice data, by using data from previous conversations between parties on the current call. The server can also learn specifics about a user's speech to create a personal dictionary of previously used words. Accordingly, the server, upon a detection of packet loss would interpret what was said during a conversation using the good packets, and choose the best word(s) and/or sound(s) to fill the void left by the missing packet. The server can employ a variety of additional functionality, i.e., tone analyzer, speech to text converter, natural language classifier, natural language understand or the like, to learn specifics about the user's speech.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for addressing packet loss over a Voice over Internet Protocol (VoIP) network using phonemic restoration, the method comprising:
   receiving, by a processor of a server, a plurality of data packets associated with a VoIP call;
   determining, by the processor, whether one or more consecutive data packets have been lost;
   determining, by the processor and in response to determining that the one or more consecutive data packets have not been lost, whether more than one consecutive data packets have been discarded during a transfer of the plurality of data packets from a VoIP device to the processor, wherein having the more than one consecutive data packets discarded comprises a first threshold;
   determining, by the processor and in response to determining that the more than one consecutive data packets have been discarded, whether a number of the more than one consecutive discarded data packets is greater or less than a second threshold;
   inserting, by the processor, in response to the number of the more than one consecutive discarded data packets being determined to be less than the second threshold, and as a first remedy, a sound into the VoIP call, wherein the sound is configured to trigger a phonemic restoration response by a listener;
   sending, by the processor, the sound to an output device; and
   determining, by the processor, whether to initiate a second remedy based on whether the number of the more than one consecutive discarded data packets is greater than the second threshold, wherein the second remedy comprises alerting the listener, any other parties to the VoIP call, and a service provider of the VoIP call.

2. The computer-implemented method of claim 1, wherein the sound is inserted at a location of where the more than one consecutive data packets have been discarded.

3. The computer-implemented method of claim 1, wherein the sound has a duration equivalent to a duration associated with the more than one consecutive data packets that have been discarded.

4. The computer-implemented method of claim 1, wherein the sound is used to mask the more than one consecutive data packets that have been discarded.

5. The computer-implemented method of claim 1, wherein the sound is associated with a speaker's age and gender.

6. The computer-implemented method of claim 1, wherein the phonemic restoration is used to cause a listener's brain to restore sounds associated with the more than one consecutive data packets that have been discarded.

7. A computer program product for addressing packet loss over a Voice over Internet Protocol (VoIP) network using phonemic restoration, the computer program product comprising:
   a computer readable storage medium having stored thereon first program instructions executable by a processor of a server to cause the processor to:
   receive a plurality of data packets associated with a Voice over Internet Protocol (VoIP) call;
   determine whether one or more consecutive data packets have been lost;
   determine, in response to determining that the one or more consecutive data packets have not been lost, whether more than one consecutive data packets have been discarded during a transfer of the plurality of data packets from a VoIP device to the processor, wherein having the more than one consecutive data packets discarded comprises a first threshold;
   determine, in response to determining that the more than one consecutive data packets have been discarded whether a number of the more than one consecutive discarded data packets is greater or less than a second threshold;
   insert, in response to the number of the more than one consecutive discarded data packets being determined to be less than the second threshold, and as a first remedy, a sound into the VoIP call, wherein the sound is configured to trigger a phonemic restoration response by a listener;

send the sound to an output device; and determining whether to initiate a second remedy based on whether the number of the more than one consecutive discarded data packets is greater than second threshold, wherein the second remedy comprises alerting the listener, any other parties to the VoIP call, and a service provider of the VoIP call.

8. The computer program product of claim 7, wherein the sound is inserted at a location of where the more than one consecutive data packets have been discarded.

9. The computer program product of claim 7, wherein the sound has a duration equivalent to a duration associated with the more than one consecutive data packets that have been discarded.

10. The computer program product of claim 7, wherein the sound is used to mask the more than one consecutive data packets that have been discarded.

11. The computer program product of claim 7, wherein the sound is associated with a speaker's age and gender.

12. The computer program product of claim 7, wherein the phonemic restoration is used to cause a listener's brain to restore sounds associated with the more than one consecutive data packets that have been discarded.

13. A system, comprising:

one or more processors or a server; and at least one memory, the memory including instructions that, upon execution by at least one of the one or more processors, cause the system to perform a method for addressing packet loss over a Voice over Internet Protocol (VoIP) network using phonemic restoration, the method comprising:

receiving a plurality of data packets associated with a Voice over Internet Protocol (VoIP) call;

determining whether one or more consecutive data packets have been lost;

determining, in response to determining that the one or more consecutive data packets have not been lost, whether more than one data packet has been discarded during a transfer of the plurality of data packets from a VoIP device to the processor, having the more than one consecutive data packets discarded comprises a first threshold;

determining, in response to determining that the more than one consecutive data packets have been discarded, whether a number of the more than one consecutive discarded data packets is greater or less than a second threshold;

inserting, in response to the number of the more than one consecutive discarded data packets being determined to be less than the second threshold, and as a first remedy, a sound into the VoIP call, wherein the sound is configured to trigger a phonemic restoration response by a listener;

sending the sound to an output device; and determining whether to initiate a second remedy based on whether the number of the more than one consecutive discarded data packets is greater than the second threshold, wherein the second remedy comprises alerting the listener, any other parties to the VoIP call, and a service provider of the VoIP call.

14. The system of claim 13, wherein the sound has a duration equivalent to a duration associated with the more than one consecutive data packets that have been discarded.

15. The system of claim 13, wherein the phonemic restoration is used to cause a listener's brain to restore sounds associated with the more than one consecutive data packets that have been discarded.

16. The system of claim 13, wherein the sound is used to mask the more than one consecutive data packets that have been discarded.

17. The system of claim 13, wherein the sound is associated with a speaker's age or gender.

\* \* \* \* \*